US006661219B2

(12) United States Patent
Schmidt

(10) Patent No.: US 6,661,219 B2
(45) Date of Patent: Dec. 9, 2003

(54) APPARATUS HAVING AN ELECTROMAGNETIC ACTUATOR INCLUDING AN ARMATURE AND AT LEAST ONE INDUCTIVE ELEMENT CONNECTED TO THE ARMATURE FOR DETERMINING THE POSITION OF THE ARMATURE

(75) Inventor: Robert Schmidt, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/948,225

(22) Filed: Sep. 6, 2001

(65) Prior Publication Data

US 2002/0047707 A1 Apr. 25, 2002

(30) Foreign Application Priority Data

Sep. 6, 2000 (DE) ........................................ 100 43 805

(51) Int. Cl.[7] ............................ H01F 7/121; F01L 9/04; G01B 7/14

(52) U.S. Cl. ............................ 324/207.16; 324/207.24; 123/90.11

(58) Field of Search ....................... 324/207.16, 207.21, 324/207.2, 207.23, 207.22, 207.24, 545, 546; 322/3; 123/617, 90.11; 340/686.1; 361/151, 160, 170, 187; 251/129.01, 129.04, 129.07

(56) References Cited

U.S. PATENT DOCUMENTS 4,809,742 A * 3/1989 Grau .......................... 137/554
4,810,965 A * 3/1989 Fujiwara et al. ....... 324/207.22
5,172,298 A * 12/1992 Shimizu et al. ............. 361/152
5,481,187 A * 1/1996 Marcott et al. ........ 324/207.16
5,692,463 A * 12/1997 Liang et al. ............. 123/90.11
5,889,405 A * 3/1999 Yanai et al. ................ 324/522
6,003,481 A * 12/1999 Pischinger et al. ...... 123/90.11
6,257,182 B1 * 7/2001 Hara et al. ............... 123/90.11

FOREIGN PATENT DOCUMENTS

| | | |
|---|---|---|
| DE | 196 28 860 | 1/1998 |
| DE | 198 13 395 | 9/1999 |
| EP | 0 995 883 | 4/2000 |
| JP | 07-224624 | 8/1995 |
| JP | 11-081940 | 3/1999 |

* cited by examiner

*Primary Examiner*—N. Le
*Assistant Examiner*—Reena Aurora
(74) *Attorney, Agent, or Firm*—Kenyon & Kenyon

(57) ABSTRACT

An apparatus having an electromagnetic actuator for operating an actuating element, in particular an inlet or exhaust valve of an internal combustion engine, which includes an electromagnetic unit via which an armature which is mounted such that it may move and is operatively connected to the actuating element may be moved, and having a measurement apparatus which includes at least one inductive measurement element at least for detecting a position of the armature, and in particular having a spring mechanism which acts on the actuating element. At least one inductive measurement element may be firmly connected to the armature.

11 Claims, 4 Drawing Sheets

APPARATUS HAVING AN ELECTROMAGNETIC ACTUATOR INCLUDING AN ARMATURE AND AT LEAST ONE INDUCTIVE ELEMENT CONNECTED TO THE ARMATURE FOR DETERMINING THE POSITION OF THE ARMATURE

FIELD OF THE INVENTION

The invention relates to an apparatus having an electromagnetic actuator.

BACKGROUND INFORMATION

An actuator of this type for operating an inlet or exhaust valve of an internal combustion engine is described in Japanese Published Patent Application No. 07 224 624. The electromagnetic actuator includes two electromagnets, an opening magnet and a closing magnet, between the pole surfaces of which an armature is arranged such that it can be moved coaxially with respect to a valve axis. The armature acts on a valve stem of the inlet or exhaust valve. Furthermore, a prestressed spring mechanism acts on the inlet or exhaust valve via the armature. Two prestressed compression springs are used as the spring mechanism, of which an upper compression spring loads the inlet or exhaust valve in the opening direction, and a lower compression spring loads the inlet or exhaust valve in the closing direction. When the electromagnets are not energized, the armature is held in an equilibrium position between the electromagnets, by the compression springs and valve springs.

In addition to an operating coil, the electromagnets each have a measurement coil. The measurement coils are arranged in the radially inner region of the operating coils. The position of the armature between the electromagnets influences the inductance of the measurement coils, by which the position of the armature can be deduced from the detected inductance values of the measurement coils. The inductance decreases in a highly non-linear manner with the distance between the armature and the measurement coils, and the measurement coils are subject to strong magnetic fields from the operating coils during operation.

Furthermore, an electromagnetic actuator for operating an inlet or exhaust valve in an internal combustion engine and having a pivoting armature is described in German Published Patent Application No. 196 28 860, which pivoting armature is mounted between two electromagnets such that it can pivot about one axis.

It is an object of the present invention to provide an apparatus having an actuator for operating an actuating element, in which the position of the armature and/or of the actuating element may be detected as accurately as possible and over a wide range during operation of the actuator.

SUMMARY

The above and other beneficial objects of the present invention are achieved by providing an apparatus as described herein.

The present invention relates to an apparatus having an electromagnetic actuator for operating an actuating element, in particular an inlet or exhaust valve of an internal combustion engine, which includes an electromagnetic unit via which an armature which is mounted such that it may move and is operatively connected to the actuating element may be moved, and having a measurement apparatus which has at least one inductive measurement element at least for detecting a position of the armature, and in particular having a spring mechanism which acts on the actuating element.

At least one inductive measurement element may be firmly connected to the armature. The inductive measurement element, which is firmly connected to the armature and is thus moved with the armature, allows any dead band to be reduced, in which no measurement signal, or only an inaccurate, weak measurement signal, may be detected during operation. In contrast to an inductive measurement element which is attached to an electromagnet in the electromagnetic unit, the measurement element which is attached to the armature is not continuously subjected to a strong magnetic field, but moves into and out of the magnetic fields of the electromagnets, by which a large measurement signal, which may be evaluated well, may be detected at an early stage before the armature meets a pole surface of the electromagnets. Advantageous open and closed-loop control of the armature movement may be achieved on the basis of a small dead band. Furthermore, a measurement element which moves with the armature allows the position of the armature with respect to two electromagnets that are at a distance from one another to be detected, without having to attach an inductive measurement element to each electromagnet. If, in addition to the inductive measurement element which is firmly connected to the armature, at least one additional inductive measurement element is attached to the electromagnetic unit, so that at least two measurement signals may be detected, this results in a particularly accurate measurement, e.g., because correction values may be determined.

In order to achieve a measurement signal which is as large as possible and may be detected and evaluated well, the measurement element which is firmly connected to the armature is formed by a measurement coil, e.g., by a measurement coil having a number of turns.

The inductive measurement element may be at least partially fitted in the armature. The measurement element may be arranged such that it is protected against external influences, and any reduction in a contact area of the armature may be avoided, with the physical volume remaining unchanged. If, furthermore, the measurement element is fitted in the armature during production, for example, during a casting process, this furthermore allows attachment parts, assembly effort and costs to be avoided. However, it is also possible for the measurement element, which is in the form of a measurement coil, to be wound onto the armature, and this may be achieved in a physically simple manner. Furthermore, all the positively locking, force-fitting and/or integral-material connections are possible, for example, bonded joints, soldered joints, etc.

The measurement element may be arranged on one surface of the armature so that, when the armature meets a pole surface of the electromagnetic unit, the armature enters a recess in the pole surface, in which a winding of the electromagnetic unit is fitted. There is no need for any additional recesses or additional physical space.

The data detected by the measurement element may be transmitted via various data transmission devices from the moving armature to a receiving unit which is firmly connected to a housing, for example, by radio, infrared, sliding contacts, etc. However, if the armature is mounted such that it may pivot, this makes it possible to transmit data in a physically simple manner via a pivoting shaft of the armature, e.g., via data lines.

DETAILED DESCRIPTION

Figure 1:
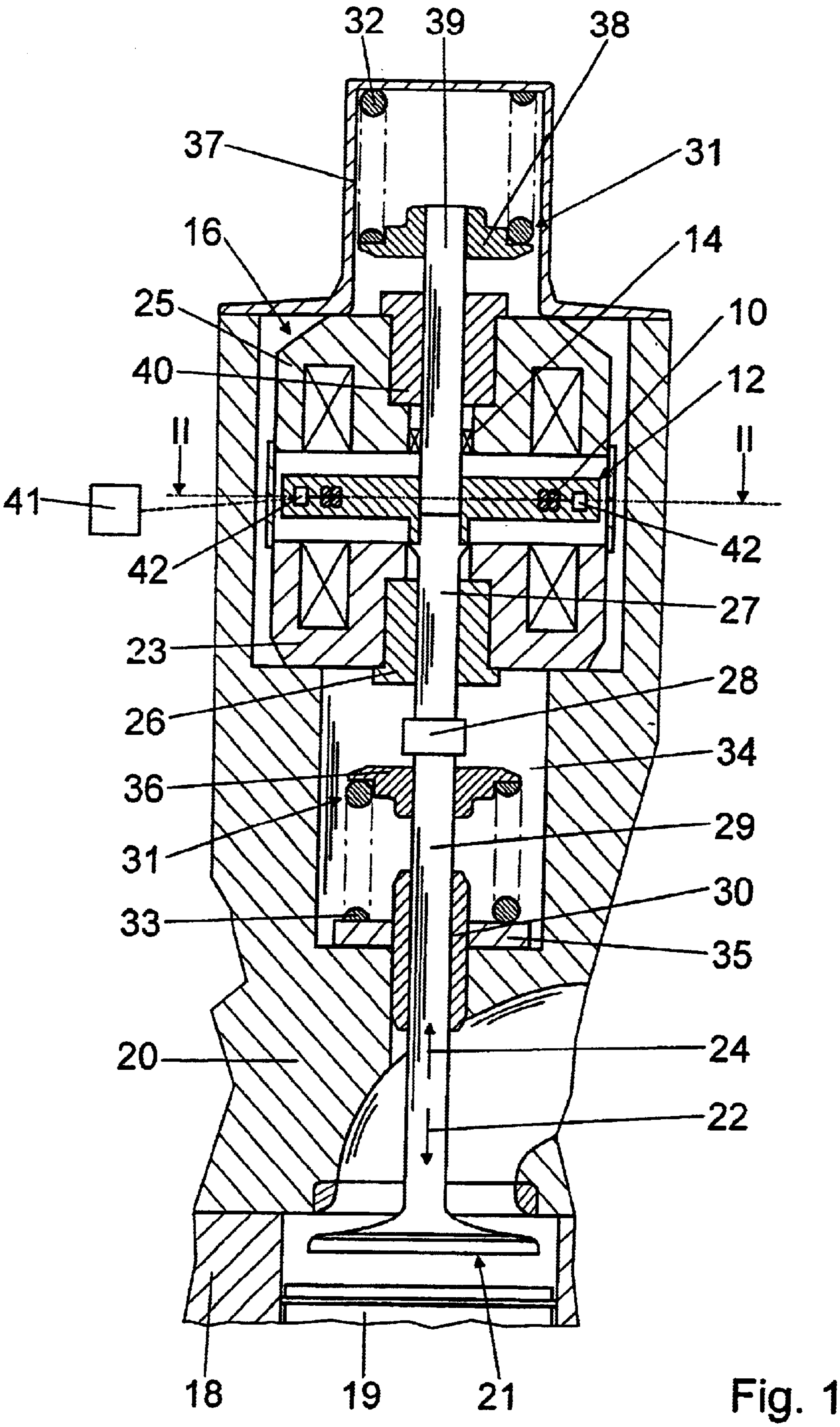
FIG. 1 is a longitudinal cross-sectional view through an electromagnetic actuator.

FIG. 1 illustrates a detail of an internal combustion engine in a motor vehicle, having a reciprocating piston 19, which is guided in a cylinder block 18, and a cylinder head 20 which ends at the cylinder block 18. A valve drive with an electromagnetic actuator for operating an inlet or exhaust valve 21 is arranged in the cylinder head 20.

The actuator includes an electromagnetic unit 16 with a first opening magnet 23, which acts in the opening direction 22, and a second closing magnet 25, which acts in the closing direction 24, and between which an armature 12 is arranged such that it may be moved coaxially. The armature 12 acts via an armature shaft 27, which is guided in an armature shaft guide 26, and via a hydraulic play compensation element 28 on a valve stem 29, which is guided in a valve guide 30 in the cylinder head 20.

Furthermore, a spring mechanism 31 acts on the valve stem 29 and includes an upper valve spring 32, which acts in the opening direction 22, and a lower valve spring 33, which acts in the closing direction 24. The valve spring 33, which acts in the closing direction 24, is arranged in a spring area 34, which is incorporated in the cylinder head 20, on the side of the opening magnet 23 facing the inlet or exhaust valve 21, is supported via a ring 35 on the cylinder head 20, and acts via a spring contact 36 in the closing direction 24 on the valve stem 29.

The valve spring 32 which acts in the opening direction 22 is arranged on the side of the closing magnet 25 facing away from the inlet or exhaust valve 21 and is supported at an end facing away from the inlet or exhaust valve 21 on a cover 37 which is mounted on the cylinder head 20 and acts with an end, which faces the inlet or exhaust valve 21, via a spring contact 38 on a spring tappet 39, which is guided via a guide 40 in the closing magnet 25 and one end face of which, which points in the direction of the inlet or exhaust valve 21, acts on an end face of the armature shaft 27.

In order to draw the armature 12 out of its equilibrium position between the electromagnets 23, 25 when starting the internal combustion engine, either the closing magnet 25 or the opening magnet 23 is briefly overenergized, or the armature 12 is caused to oscillate at its resonant frequency 30 by an oscillation-formation routine.

When the inlet or exhaust valve 21 is in the closed position, the armature 12 rests on a pole surface of the closing magnet 25, through which current is passing, and is held by it. The closing magnet 25 further prestresses the valve spring 32 which acts in the opening direction 22.

In order to open the inlet or exhaust valve 21, the closing magnet 25 is switched off, and the opening magnet 23 is switched on. The valve spring 32 which acts in the opening direction 22 accelerates the armature 12 beyond the equilibrium position, so that it is attracted by the opening magnet 23, and the valve spring 33 which acts in the closing direction is further prestressed. The armature 12 strikes a pole surface of the opening magnet 23 and is held by it. In order to close the inlet or exhaust valve 21, the opening magnet 23 is switched off, and the closing magnet 25 is switched on. The valve spring 33 which acts in the closing direction 24 accelerates the armature 12 beyond the equilibrium position towards the closing magnet 25. The armature 12 is attracted by the closing magnet 25, strikes the pole surface of the closing magnet 25 and is held by it.

Figure 2:
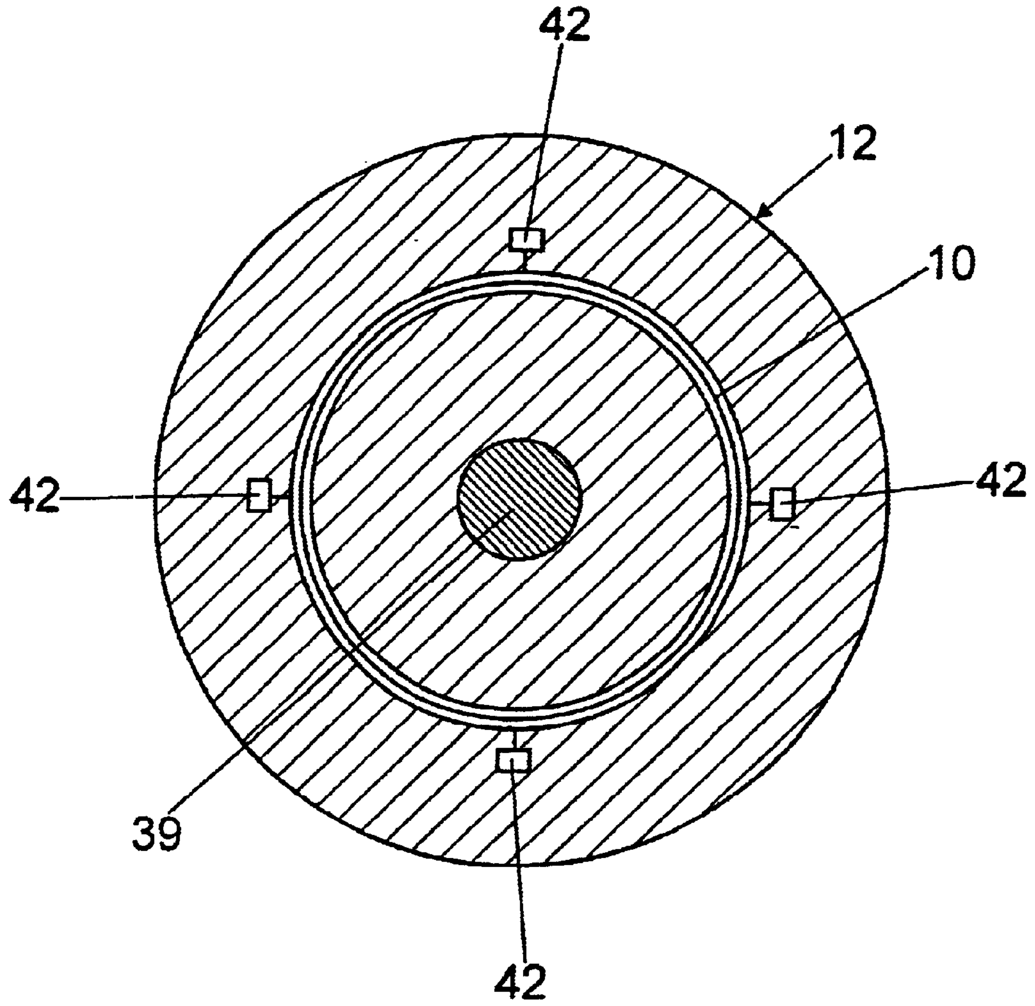
FIG. 2 is a cross-sectional view of the electromagnetic actuator illustrated in FIG. 1 taken along the line II—II.

In order to allow the movement of the armature 12 to be controlled with an open or closed loop, its position, speed and acceleration are, according to the present invention, detected via inductive measurement elements 10, 14 which are in the form of measurement coils having a number of turns. One of the measurement elements 10 is introduced into the armature 12 such that it is firmly connected to it, and the other measurement element 14 is mounted on that side of the guide 40 for the spring tappet 39 in the closing magnet 25 which faces the inlet or exhaust valve 21, next to the pole surface of this closing magnet 25. The data detected by the measurement element 14 which is arranged in the closing magnet 25 are transmitted via data lines, and the data detected by the measurement element 10 which is arranged in the armature 12 are transmitted via four transmitters 42, which are distributed uniformly over the circumference of the armature 12, via infrared to a receiving and evaluation unit 41 as illustrated in FIGS. 1 and 2.

Figure 3:
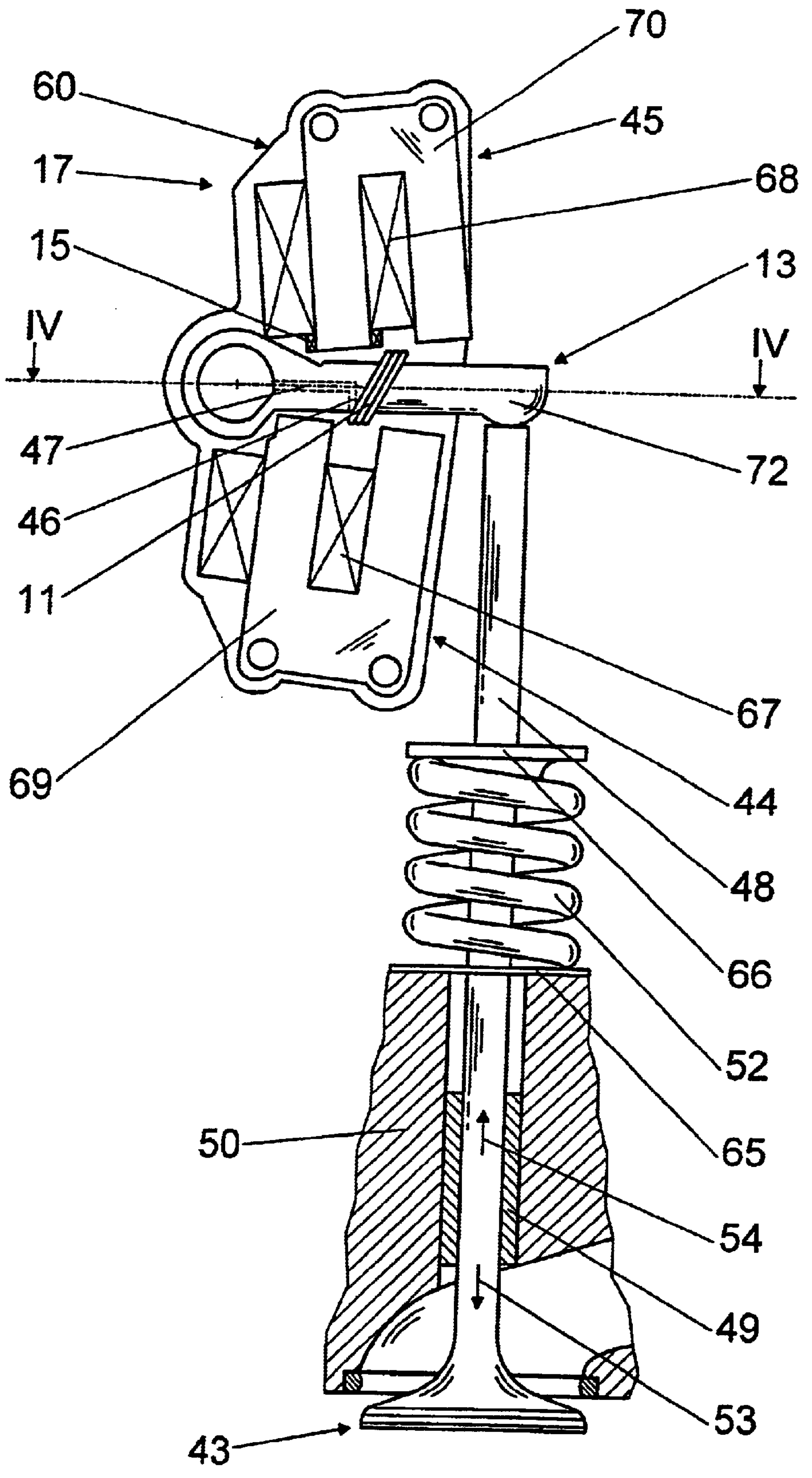
FIG. 3 is a longitudinal cross-sectional view of an electromagnetic actuator having a pivoting armature.
Figure 4:
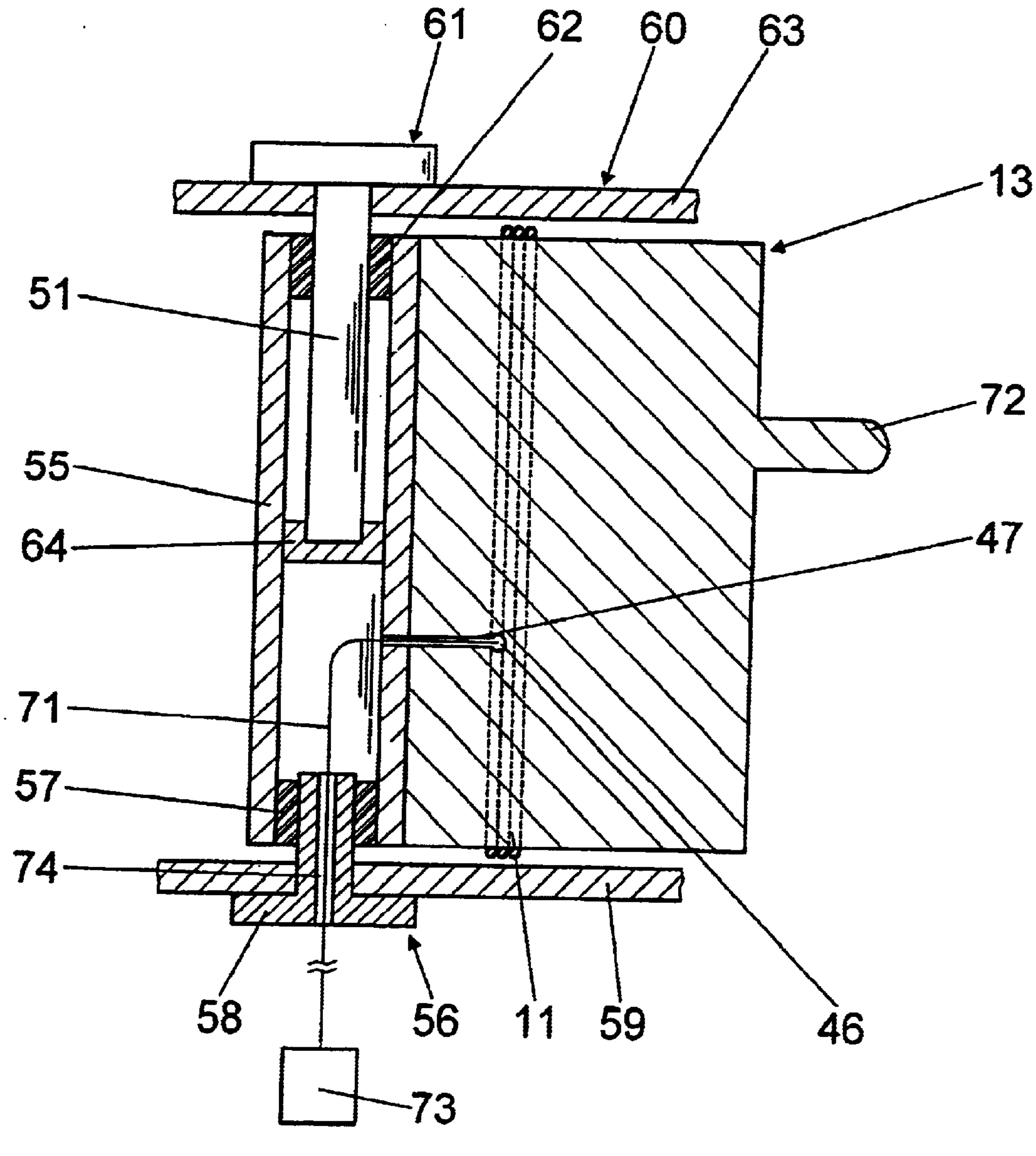
FIG. 4 is a cross-sectional view of the electromagnetic armature illustrated in FIG. 3 taken along the line IV—IV.

FIG. 3 illustrates an alternative electromagnetic actuator for operating an inlet or exhaust valve 43 of an internal combustion engine. The actuator includes an electromagnetic unit 17 with two electromagnets 44, 45, an opening magnet 44 and a closing magnet 45. Each of the electromagnets 44, 45 includes a solenoid coil 67, 68, which is wound on a coil former, and a coil core 69, 70 with two yoke limbs, the end faces of which form pole surfaces. A pivoting armature 13 is mounted between the pole surfaces such that it may pivot in both directions about one axis. The pivoting armature 13 acts via a projection 72, which is integrally formed on it, and via a valve stem 48 on the inlet or exhaust valve 43 as illustrated in FIGS. 3 and 4. The valve stem 48 is mounted, such that it may be moved axially, via a stem driver 49 in a cylinder head 50 of the internal combustion engine.

Furthermore, the actuator includes a spring mechanism with two prestressed valve springs 51, 52, e.g., with a valve spring 51 which is in the form of a torsion rod spring and acts in the opening direction 53, and with a valve spring 52, which is in the form of a helical compression spring and acts in the closing direction 54.

The pivoting armature 13 is firmly welded to a hollow pivoting shaft 55 as illustrated in FIG. 4. The pivoting shaft 55 is mounted in a first bearing point 56 via first sliding bearing 57 on a bearing bolt 58 in a first housing wall 58 of an actuator housing 60 and is mounted in a second bearing point 61 via a second sliding bearing 62 on the torsion rod spring in a second housing wall 63 of the actuator housing 60. The torsion rod spring is connected at one end to the housing wall 63 such that it may not rotate and acts on the inlet or exhaust valve 43 via a separating wall 64, which is arranged in the pivoting shaft 55 such that it may not rotate, via the pivoting shaft 55, via the pivoting armature 13, and via the valve stem 43.

The helical compression spring is supported via a first spring mounting 65 on the cylinder head 50 and acts on the inlet or exhaust valve 43 via a second spring mounting 66 and via the valve stem 48 as illustrated in FIG. 3. When the electromagnets 44, 45 are not energized, the pivoting armature 13 is held by the valve springs 51, 52 in an equilibrium position between the pole surfaces of the electromagnets 23, 25. The actuator is started in a corresponding manner to the actuator illustrated in FIGS. 1 and 2.

In order to allow the movement of the pivoting armature 13 to be controlled by an open loop or closed loop, its position, speed and acceleration are detected, according to the present invention, via inductive measurement elements 11, 15 in the form of measurement coils having a number of turns. The one measurement element 11 is wound onto the pivoting armature 13, and the other measurement element 15 is mounted in the closing magnet 45, on a side of the solenoid coil 68 facing the inlet or exhaust valve 43.

The data detected by the measurement element 15 which is arranged in the closing magnet 45 are transmitted via data lines, and the data which are detected by the measurement element 11 which is wound on the armature 12 are transmitted via a data line 71 to a receiving and evaluation unit 73. The data line 71 is routed from the measurement element 11 through a hole 46, which extends in the direction of movement of the pivoting armature 13, and through a hole 47, which extends at right angles to the movement direction, in the pivoting armature 13 into the hollow pivoting shaft 55, from where the data line 71 is routed through a hole 74 in the bearing bolt 58 to the receiving and evaluation unit 73.

When the pivoting armature 13 strikes the pole surface of the closing magnet 45, the measurement element 11 passes between the yoke limbs of the closing magnet 45, and when the pivoting armature 13 strikes the pole surface of the opening magnet 44, the measurement element 11 passes between the yoke limbs of the opening magnet 44.

What is claimed is:

1. An apparatus, comprising:

an electromagnetic actuator configured to operate an actuating element, the electromagnetic actuator including an electromagnetic unit and an armature, the armature movably mounted via the electromagnetic unit and operatively connected to the actuating element, the armature being configured to be movable in accordance with the electromagnetic unit;

a measurement apparatus having at least one inductive measurement element configured at least to detect a position of the armature, the at least one inductive measurement element fixedly connected to the armature; and a spring mechanism configured to act on the actuating element.

2. The apparatus according to claim 1, wherein the actuating element includes one of an inlet valve and an outlet valve of an internal combustion engine.

3. The apparatus according to claim 1, wherein the at least one inductive measurement element is firmly connected to the electromagnetic unit.

4. The apparatus according to claim 1, wherein the inductive measurement element includes a measurement coil.

5. The apparatus according to claim 4, wherein the measurement coil includes a plurality of turns.

6. The apparatus according to claim 5, wherein the measurement coil is wound onto the armature.

7. The apparatus according to claim 4, wherein the measurement coil is wound onto the armature.

8. The apparatus according to claim 1, wherein the inductive measurement element is at least partially fitted in the armature.

9. The apparatus according to claim 1, wherein the armature is pivotably mounted via the electromagnetic unit.

10. The apparatus according to claim 1, further comprising a second inductive measurement element mounted in the electromagnetic unit.

11. The apparatus according to claim 1, wherein the at least one inductive measurement element is not in the electromagnetic unit.

* * * * *